United States Patent

[11] 3,627,766

[72] Inventors Kurt Eichenberger;
Paul Schmidt, both of Therwil; Ernst
Schweizer, Basel, all of Switzerland
[21] Appl. No. 845,054
[22] Filed July 25, 1969
[45] Patented Dec. 14, 1971
[73] Assignee Ciba Corporation
Summit, N.J.
[32] Priorities Aug. 2, 1968
[33] Switzerland
[31] 11640/68;
June 20, 1969, Switzerland, No. 9468/69

[54] 5,6,7,8-TETRAHYDRO-PYRIDO[4',3':4,5]THIENO[2,3-D]PYRIMIDINES
14 Claims, No Drawings
[52] U.S. Cl. .................................................. 260/256.5 R,
260/243 B, 260/247.1, 260/248 C, 424/200,
424/232, 424/246, 424/248, 424/251
[51] Int. Cl. ......................................................... C07d 99/06
[50] Field of Search........................................... 260/256.5,
243 B, 247.1

[56] References Cited
UNITED STATES PATENTS
3,164,604   1/1965   Doyle ..........................   260/306.7

*Primary Examiner*—Alex Mazel
*Assistant Examiner*—R. J. Gallagher
*Attorneys*—Harry Goldsmith, Joseph G. Kolodny and Mario A. Monaco ABSTRACT: Compounds of the formula

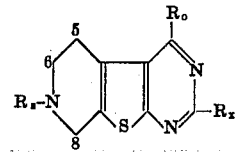

in which $R_o$ stands for an aminoalkylamino group, $R_r$ and $R_x$ for an optionally substituted hydrocarbon radical or hydrogen and which may be substituted in positions 5, 6 and/or 8 are useful as chemotherapeutic and prophylactic agents against malaria.

5,6,7,8-TETRAHYDRO-PYRIDO[4',3':4,5]THIENO[2,3-D]PYRIMIDINES

SUMMARY OF THE DISCLOSURE

The present invention relates to new 5,6,7,8-tetrahydro-pyrido[4',3':4,5]thieno[2,3-d]pyrimidines. Especially it concerns 5,6,7,8-tetrahydro-pyrido[4',3':4,5]thieno[2,3-d]pyrimidines having the nucleus of the formula

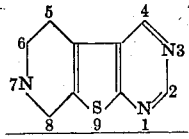

which contains an amino-lower alkylamino group in the 4-position, and their salts, as well as pharmaceutical preparations containing those compounds and a process for treating malaria which consists in administering to a warm-blooded being such pharmaceutical preparations.

The terminal amino group of the aminoalkylamino group in the 4-position may be unsubstituted or substituted. A substituted amino group is preferably an aliphatic amino group, that is to say an amino group which is monosubstituted or disubstituted by residues of aliphatic character. Herein residues of alphatic character are above all aliphatic hydrocarbon radicals. Accordingly the following may be mentioned as substituents of a terminal secondary or tertiary amino group: lower hydrocarbon residues of aliphatic character which may also be interrupted by hetero atoms such as oxygen, sulfur or nitrogen atoms in the carbon chain and/or substituted, for example by hydroxyl groups. Lower hydrocarbon residues of aliphatic character acting as substituents of the terminal amino group are above all the following residues having at most eight carbon atoms: alkyl, alkenyl or alkylene residues. Residues of this nature interrupted by hetero-atoms are above all oxaalkylene, azaalkylene or thiaalkylene residues. As substituents of the terminal amino group there should especially be mentioned methyl, ethyl, allyl, propyl, isopropyl, methallyl, straight-chain or branched butyl, pentyl, hexyl or heptyl residues bonded in any desired position, 2-hydroxyethyl or 3-hydroxypropyl residues, butylene-(1,4), pentylene-(1,5), hexylene-(1,5), hexylene-(1,6), hexylene-(2,5), heptylene-(1,7), heptylene-(2,7), heptylene-(2,6), 3-oxapentylene-(1,5), 3-thiapentylene-(1,5), 2,4-dimethyl-3-thiapentylene-(1,5), 3-aza-pentylene-(1,5), 3-lower alkyl-3-aza-pentylene-(1,5), such as 3-methyl-3aza-pentylene-(1,5), 3-(hydroxy-lower alkyl)-3-aza-pentylene-(1,5), such as 3-(β-hydroxyethyl)-3-aza-pentylene-(1,5), 3-oxahexylene-(1,6) or 3-azahexylene-(1,6) residues.

In the amino-lower alkylamino group in the 4-position the lower alkylene residue which joins the two nitrogen atoms is especially a straight-chain or branched alkylene residue having preferably at most six carbon atoms which separates the two nitrogen atoms by two to five, preferably two to three, above all two, carbon atoms, such as an ethylene-(1,2), propylene-(1,3), butylene-(1,4), pentylene-(1,5), pentylene-(2,5), butylene-(2,4), propylene-(1,2), propylene-(2,3) or butylene-(3,4) residue.

In the aminoalkylamino group mentioned a substituent of the amino group may also be bonded to the alkylene residue which joins the two nitrogen atoms.

The nitrogen atom of the aminoalkylamino group located on the pyrimidine ring is preferably unsubstituted but can however also be substituted, for example by a lower alkyl residue such as one of those mentioned.

The aminoalkylamino group in the 4-position is especially a mono-lower alkylamino-lower alkylamino group or above all a di-lower alklamino-lower alkylamino group, a pyrrolidino- or piperidino-lower alkylamino group which is optionally C-lower alkylated in the ring and/or β-singly unsaturated in the ring, a piperazino-, N'-lower alkyl-piperazino or N'-(hydroxy-lower alkyl)-piperazino-, thiomorpholino- or morpholino- lower alkylamino group which is optionally C-lower alkylated in the ring, or an N-lower alkylpyrrolidinyl-2- or -3-lower alkylamino group or N-lower alkylpiperidyl-2-, -3- or -4-lower alkylamino group, it also being possible for the nitrogen atom located on the pyrimidine nucleus to be further substituted by a lower alkyl residue and hence to be tertiary.

The new compounds may contain further substituents.

Thus, for example, they may contain in position(s) 6 and/or 8 mono- or divalent, possibly substituted, hydrocarbon residues. As substituents in positions 6 and/or 8 there may be specially mentioned alkyl residues such as lower alkyl residues, especially those with one–six carbon atoms, such as methyl, ethyl, propyl, isopropyl residues; linear or branched butyl, pentyl or hexyl residues linked in any desired position; alkenyl such as lower alkenyl residues, for example allyl or methallyl residues, alkylene such as linear or branched lower alkylene residues, for example butylene-(1,4), pentylene-(1,5) or hexylene-(1,6) residues or aryl- or aralkyl residues, especially phenyl or phenyl-lower alkyl such as benzyl, phenylethyl or phenylpropyl residues (whose aromatic residue may also be substituted). As substituents of the aryl residues and of the aryl portion of aralkyl residues there may be mentioned in the first place lower alkyl residues, for example those mentioned above, lower alkoxy residues such as methoxy, ethoxy, propoxy or butoxy residues, methylenedioxy groups, halogen atoms such as fluorine, chlorine or bromine atoms, trifluoromethyl groups, hydroxyl, nitro or amino groups or acyloxy or acylamino groups, in which the acyl residues are especially those of saturated carboxylic acids preferably containing at most eight carbon atoms, especially lower alkane acids such as acetic, propionic or butyric acid, or phenyl-lower alkane acids such as benzoic or phenylacetic acids which may be substituted, for example as indicated for the aryl residues.

In position 5 the new compounds may contain primarily possibly substituted hydrocarbon residues, such as phenyl or phenyl-lower alkyl residues, for example those mentioned above, or more especially lower alkyl residues, for example those mentioned above.

The new compounds may also be substituted in position 2, above all by optionally substituted hydrocarbon residues such as for example lower alkyl, alkenyl or aralkyl residues, such as for example those mentioned, or cycloalkyl or cycloalkyl-alkyl residues, e.g. optionally lower alkylated, such as methylated, cyclopropyl, cyclopentyl or cyclohexyl residues or cyclopropyl-, cyclopentyl- or cyclohexyl-methyl or -ethyl residues.

In position 7 the new compounds are preferably substituted. As substituents they contain especially possibly substituted hydrocarbon residues, especially lower alkyl, alkenyl, cycloalkyl, cycloalkyl-alkyl residues or phenyl, phenyl-lower alkyl residues, for instance those mentioned above.

The new compounds possess valuable pharmacological properties, above all an antibacterial and antiparasitary action. Thus they especially exhibit an action against plasmodia, for example *Plasmodium berghei*, as is found in animal experiments, for example on peroral administration of 4×100 to 300 mg./kg. (administered on 4 successive days) to albino mice. The new compounds are also active against strains of plasmodia which are resistant to other antimalaria agents, as for example primaquine. The new compounds are therefore useful as chemotherapeutics against malaria and also, in particular, as prophylactics against that disease. Furthermore, as can be shown in animal experiments, for example on oral administration of 100 to 200 mg./kg. to hamsters infected with *E. histolytica*, they have an amoebicidal effect and are therefore useful as amoebicides. In addition they possess an anti-inflammatory and an antihypertensive action. The new compounds are also valuable intermediates for the manufacture of other useful substances, especially of pharmacologically active compounds.

Special mention deserve the compounds of the formula

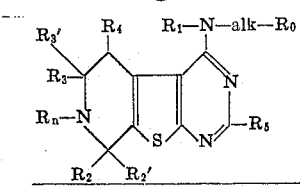

Ia in which alk represents a linear or branched lower alkylene radical which separates $R_o$ from the nitrogen atom in position 4 by two to five, especially two or three carbon atoms; $R_o$ represents an amino group, especially a secondary or preferably tertiary amino group, for example a mono-lower alkylamino or especially a di-lower alkylamino group, or a lower alkyleneamino, oxaalkylene-amino azaalkylene-amino or thiaalkylene-amino group such as a piperidino or pyrrolidino group which may be β-mono-unsaturated in the ring and/or C-lower alkylated or a possibly C-lower alkylated morpholino, thiomorpholino, piperazino, N'-lower alkylpiperazino of N'-(hydroxy-lower alkyl)-piperazino group such as N'-methyl- or N'-(β-hydroxyethyl)-piperazino group; $R_1$ represents a lower alkyl residue or preferably a hydrogen atom; $R_2$, $R'_2$, $R_3$ and $R'_3$ may be identical or different and each stands for a lower alkyl residue, a phenyl-lower alkyl or phenyl residue which may be substituted, for example as indicated above, or a hydrogen atom, $R'_2$ and $R'_3$ preferably being hydrogen atoms and $R_2$ and $R_3$ each representing one of the indicated residues, or $R_2+R'_2$ or $R_3+R'_3$ may represent a possible C-lower alkylated pentylene-(1,5) or butylene-(1,4) residue; $R_4$ represents a lower alkyl residue or preferably a hydrogen atom, and $R_5$ represents a lower alkyl residue, a phenyl-lower alkyl residue which may be substituted, for example as indicated, such as a benzyl or phenylethyl residue, or especially a hydrogen atom, and $R_n$ represents a possibly substituted hydrocarbon residue, especially a lower alkyl, alkenyl, cycloalkyl or cycloalkyl-alkyl residue or a phenyl or phenyl-lower alkyl residue or hydrogen, and more especially those compounds of the formula Ia in which $R_o$, $R_1$, R, $R_5$ and $R_n$ have the above meanings; $R'_2$ and $R'_3$ each is a hydrogen atom and $R_2$ and $R_3$ may be identical or different and represent phenyl residues which may be substituted by one, two or more lower alkyl residues, trifluoromethyl groups and/or especially lower alkoxy groups and/or in the first place halogen atoms, for example, bromine or especially chlorine atoms; preferably, at least one substituent is in p-position.

Particularly valuable because of their good antimalaria activity are the compounds of the formula

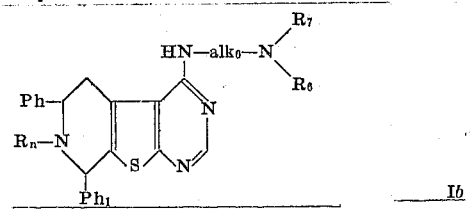

Ib in which Ph and Ph' represent phenyl residues substituted by one, two or more lower alkoxy groups and/or halogen atoms, especially chlorine atoms; $alk_o$ represents a linear or branched lower alkylene residue which separates the two nitrogen atoms by two carbon atoms; $R_n$ has the above meaning, and $R_6$ and $R_7$ represent lower alkyls, and more especially the cis-4-(β-diethylaminoethylamino)-6,8-bis-(p-chlorophenyl)-7-methyl-5,6,7,8-tetrahydro-pyrido[4',3':4,5]thieno[2,3-d]pyrimidine and above all the cis-4-(β-dimethylaminoethylamino)-6,8-bis-(p-chlorophenyl)-7-methyl-5,6,7,8-tetrahydro-pyrido[4',3':4,5]-thieno[2,3-d]pyrimidine which, for example in form of its dihydrochloride, on oral administration on albino mice on 4 consecutive days in doses of 100 mg./kg. each (referred to the free base) produces a distinct antimalarial effect. The last-mentioned compound possesses especially an activity towards chloroquin-resistant plasmodiae.

Furthermore, there are of value the compounds of the formula

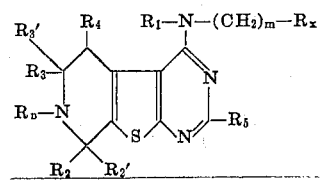

Ic in which $R_1$, $R_2$, $R'_2$, $R_3$, $R'_3$, $R_4$, $R_5$ and $R_n$ have the general and preferred meanings defined above; $m=1$ or 2, and $R_x$ represents an N-lower alkyl-pyrrodinyl-2 or 3-residue or an N-lower alkyl-piperidinyl-2,3 or 4-residue.

The new compounds are prepared by known methods.

Preferably, a 4-Y-5,6,7,8-tetrahydro-pyrido[4',3':4,5]thieno[2,3-d]pyrimidine, in which Y is a halogen atom, such as a bromine or especially a chlorine atom, is reacted with an appropriate amino-lower alkylamine having at least one hydrogen atom on a nitrogen atom.

The reaction is effected in the usual manner, appropriately at elevated temperature; if desired, an excess of amino-lower alkylamine may be used. The reaction can be effected in the presence or absence of a diluent, optionally in a closed vessel under pressure and/or in an inert gas atmosphere.

The new compounds may also be obtained when a 4-$Y_o$-5,6,7,8-tetrahydro-pyrido[4', 3':4,5]thieno[2,3-d]pyrimidine, in which $Y_o$ represents a reactive esterified hydroxy-lower alkylamino group, is reacted with ammonia or an amine which has at least one hydrogen atom at the nitrogen atom.

A reactive esterified hydroxyl group is therein for example a hydroxyl group esterified with a hydrohalic acid, such as hydrochloric or hydrobromic acid, or with an arylsulfonic acid such as benzenesulfonic, p-bromobenzenesulfonic or p-toluenesulfonic acid.

The reaction takes place in the usual manner, preferably in the presence of a solvent and advantageously in the presence of a condensation agent such as a basic agent.

The new compounds in which at least one amino group carries at least one hydrogen atom at the nitrogen atom may also be obtained when in a 4-$Y_x$-5,6,7,8-tetrahydro-pyrido[4',3':4,5]thieno[2,3-d]pyrimidine, in which $Y_x$ represents a corresponding amino-lower alkylamino group carrying on at least one nitrogen atom an α-aralkyl group, such as a benzyl group, the α-aralkyl group is split off by hydrogenolysis.

The hydrogenolysis is carried out, for example by reduction with catalytically activated hydrogen, such as hydrogen in the presence of a hydrogenation catalyst such as a palladium or platinum catalyst.

The reaction takes place in the usual manner, at ordinary temperature or elevated temperature, advantageously in the presence of solvents and/or diluents.

Substituents may be introduced, converted or split off in the resulting compounds within the framework of the definition of the end substances.

Thus, for example, in resulting 4-(amino-lower alkyl-amino)-5,6,7,8-tetrahydro-pyrido[4', 3':4,5]thieno[2,3-d]pyrimidines which have at least one hydrogen atom at the nitrogen atom in the 4-position or at the nitrogen atom of the terminal amino group of the amino-lower alkylamino group, it is possible to substitute these amino groups, for example by the substituents mentioned for the 4-amino-lower alkylamino group.

The substitution is for example effected by reaction with a reactive ester of a corresponding alcohol or by means of an epoxide. The reactive esters are especially those with hydrohalic acids, such as hydrochloric, hydrobromic or hydriodic acid, sulfuric acid or arylsulfonic acids, such as benzenesulfonic, p-bromobenzenesulfonic or p-toluenesulfonic acid. The reaction takes place in the usual manner, advantageously in the presence of a basic condensation agent.

The substitution of the above-mentioned amino groups can however also be effected reductively, for example by reaction with a corresponding oxo compound such as a corresponding aldehyde or ketone, and subsequent or simultaneous reduction of the condensation product thus obtained. The reduction takes place in the usual manner, for example with hydrogen in the presence of a catalyst such as a platinum, palladium or nickel catalyst, or also with formic acid. A Schiff base obtained as the condensation product can also be reduced by means of a di-light metal hydride such as for example an alkali metal-earth metal hydride such as sodium borohydride or lithium aluminum hydride.

The reactions mentioned are effected in the usual manner, advantageously under the conditions known for analogous reactions.

In resulting compounds which contain free hydroxyl groups on an aromatic residue, such hydroxyl groups may be etherified or acylated. The acylation takes place in the usual manner, for example by reaction with a halide, such as the chloride, or an anhydride of a carboxylic acid. Etherification takes place in the usual manner, for example by reaction with a alkyl halide, such as the chloride, bromide or iodide, or a dialkyl sulfate, preferably in the presence of a strong base.

In resulting compounds which contain an acylated hydroxyl group, the latter can be split to give the free hydroxyl group. Acylated hydroxyl groups are for example those mentioned above. The splitting off is for example effected hydrolytically, catalysed by acids or bases, for example with sodium hydroxide solution, as appropriate.

In a resulting compound containing on an aromatic ring alkoxy residues, these residues may be converted into free hydroxyl groups in the usual manner, for example by hydrolysis, especially by means of a strong acid, for example hydriodic or hydrobromic acid, and if desired in the presence of a lightmetal halide such as aluminum bromide or boron bromide, or with pyridine hydrochloride or aluminum chloride in pyridine.

In a resulting compound containing nitratable aryl residues these residues may be nitrated in known manner, for example by treatment with a mixture of concentrated sulfuric acid and concentrated nitric acid, or with the mixed anhydride of nitric acid and a carboxylic acid, for example a lower alkanecarboxylic acid such as acetic acid.

In a resulting compound containing nitroaryl residues, these residues may be reduced to aminoaryl residues, for example with iron and hydrochloric acid or by means of catalytically activated hydrogen, such as hydrogen in the presence of a hydrogenating catalyst, for example a platinum, nickel or palladium catalyst, such as platinum oxide, Raney nickel or palladium carbon.

In a resulting compound that carries on aromatic residues amino groups, these groups may be acylated, for example by reaction with a halide, especially the chloride, or an anhydride of a carboxylic acid.

In a resulting acylamino compound the acyl residues may be eliminated in the usual manner, for example by hydrolysis, preferably in the presence of an acidic or basic catalyst.

In a resulting compound containing in position 7 a residue eliminable by reduction, for example an α-aralkyl residue, such as benzyl residue, this residue can be eliminated by reduction, for example as described above.

In a resulting compound containing a position 7 hydrogen atom, this atom may be exchanged for an unsubstituted or substituted hydrocarbon residue in known manner, for example by reaction with an ester of a hydrohalic acid or sulfuric acid with an appropriate alcohol, for example one of those mentioned above.

Alternatively, this exchange may be carried out by reaction with an appropriate oxo compound, such as an aldehyde or ketone, and simultaneous or subsequent reduction of the condensation product thus obtained. Suitable reducing agents are, for example, those mentioned above in connection with the reductive substitution.

The subsequent reactions may be performed singly or in combination and in any desired order of succession.

Depending on the starting materials and reaction conditions used in the final products are obtained in free form or in form of their acid addition salts which are likewise included in this invention. Thus, for example, basic, neutral or mixed salts, may result, possibly also hemi-, mono-, sesqui- or polyhydrates thereof. The acid addition salts of the new compounds can be converted in known manner into the free compound, for example with a basic reagent, such as alkali or an ion exchange resin. On the other hand, a resulting free base may form salts with organic or inorganic acids. Acid addition salts are primarily manufactured with acids capable of forming therapeutically acceptable salts. Such acids are, for example, hydrohalic acids, sulfuric or phosphoric acids, nitric or perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic, or pyruvic acid; phenylacetic, benzoic, p-aminobenzoic, anthranilic, p-hydroxybenzoic, salicylic, p-aminosalicylic, embonic, methanesulfonic, ethanesulfonic, hydroxyethanesulfonic, ethylenesulfonic acid; halobenzenesulfonic, toluenesulfonic, naphthalenesulfonic or sulfanilic acid; methionine, tryptophan, lysine or arginine.

These or other salts of the new compounds, for example their picrates, may also be used for purifying the resulting free bases by converting the free bases into salts, isolating the salts and liberating the bases again from the salts. In view of the close relationship between the new compounds in free form and in form of their salts what has been said above and hereinafter concerning the free compounds may apply also to the corresponding salts wherever possible and useful.

Depending on the chosen starting materials and the reaction conditions used the new compounds may take the form of optical antipodes, racemates or of isomer mixtures (racemate mixtures).

A resulting isomer mixture (racemate mixture) may be resolved on the strength of the physicochemical differences of the constituents in known manner into the two stereoisomeric (diastereomeric) pure racemates, for example by chromatography and/or fractional crystallisation.

Resulting racemates can be resolved by known methods (for example by recrystallization from an optically active solvent, or by means of micro-organisms or by reaction with an optically active acid capable of forming salts with the racemic compound and separation of the salts thus obtained, for example on the strength of their different solubilities) into the diastereomers from which the antipodes can be liberated by treatment with a suitable reagent. Particularly frequently used optically active acids are, for example, the D- and L-forms of tartaric, di-o-toluyltartaric, malic, mandelic, cumphorsulfonic or quinic acid. It is advantageous to isolate the more active of the two antipodes.

If during the reaction isomerization occurs, it is possible to repeat the separation after completion of the reaction, for example as described above.

The invention includes also any variant of the process in which an intermediate obtainable at any state of the process is used as starting material and any remaining step(s) is/are carried out or in which a starting material is formed under the reaction conditions or a reactant may be used in form of a salt thereof.

The present reactions are advantageously performed with the use of starting materials that furnish the groups of final products specially mentioned above and more especially the specifically described or emphasized final products.

The starting materials are known or, insofar as they are new, they are accessible by known methods.

Thus, for example, the 4-halogeno-5,6,-7,8-tetrahydro-pyrido[4'c':4,5]thieno[2,3-d]pyrimidines, preferably used as starting materials, are obtained when in an appropriate 4-hydroxy-5,6,7,8-tetrahydro-pyrido[4',3':4,5]thieno [2,3-d] pyrimidines the hydroxyl group is converted into a halogen atom such as a chlorine or bromine atom.

The conversion of the hydroxyl group into a halogen atom is carried out in known manner, for example by treatment with a halide of sulfur or especially of phosphorus, for example phosphorus pentachloride, oxychloride or trichloride or with a corresponding bromide. The reaction is performed in the usual manner, if desired in the presence of a tertiary base, such as triethylamine or dimethylaniline.

The 4-hydroxy-5,6,7,8-tetrahydro-pyrido[4',3':4,5]thieno[2,3-d]pyrimidines are obtained when a 2-amino-3-Z''-4,5,-6,7-tetrahydro-thieno[2,3-c]pyrimidine (where Z'' is a free carboxyl group, an esterified carboxyl group such as carbalkoxy group or advantageously a carbamyl group) is reacted with a reactive acid derivative, capable of bringing about the pyrimidine cyclization, of a carboxylic acid, such as an ester, amide, a halide (such as the chloride), iminoether, anhydride or a nitrile with the proviso that at least the residue Z'' or the functionally modified carboxyl group of the said carboxylic acid contains a nitrogen atom.

The 2-amino-3-Y''-4,5,6,7-tetrahydro-thieno[2,3-d]-pyrimidines in which Y'' is a free or functionally converted carboxyl group, for example a group Z'' or a cyano group, are obtained when a 4-piperidone is reacted with a compound of the formula Y''—CH$_2$—C≡N in which Y'' has the above meaning, and simultaneously or subsequently with sulfur.

The reaction is carried out in the usual manner.

In a resulting compound substituents may be introduced, modified or eliminated.

Thus, for example, in a resulting 2-amino-3-Y''-4,5,6,7-tetrahydro-thieno[2,3-c]pyridine substituents Y'' may be converted into each other.

Cyano groups may be converted in the usual manner into carbamyl or carboxyl groups, for example by hydrolysis, for instance in the presence of a strong base such as an alkali metal hydroxide, for example sodium or potassium hydroxide or in the presence of a strong acid, for example a mineral acid such as hydrochloric acid, if desired, with addition of an oxidant such as nitrous acid.

Esterified carboxyl groups and carbamyl groups may be converted into free carboxyl groups in the usual manner, for example by hydrolysis, preferably in the presence of a strong base or strong acid, for example one of those mentioned above. If desired, the hydrolysis of carbamyl groups may be performed with addition of an oxidant, such as nitrous acid.

Cyano groups can be converted into esterified carboxyl groups in the usual manner, for example by alcoholysis, such as by reaction with a suitable alcohol, advantageously in the presence of sulfuric acid and ammonium chloride.

Free or esterified carboxyl groups can also be converted into carbamyl groups in the usual manner, for example by reaction with ammonia and, as the case may be, dehydration of the intermediately formed ammonium salt.

Free carboxyl groups can be esterified in the usual manner, for example by reaction with a suitable alcohol, advantageously in the presence of an acid, such as a mineral acid, for example sulfuric or hydrochloric acid or by reaction with a suitable diazo compound, for example a diazoalkane.

Compounds with a free carboxyl group can be obtained in free form or in form of their salts with bases. A resulting free acid compound may be converted in known manner, for example by reaction with a suitable basic reagent, into the salts with bases, especially therapeutically acceptable salts with bases, for example salts with organic amines or metal salts. Especially suitable metal salts are alkali or alkaline earth metal salts such as sodium, potassium, magnesium or calcium salts. From the salts the free acids may be liberated in the usual manner, for example by reaction with acidic agents. The salts may also be used for purifying the new compounds, for example by converting the free compound into a salt thereof, isolating the salt and reconverting it into the free compound.

Resulting 2-amino-3-Y''-4,5,6,7-tetrahydro-thieno[2,3-c]pyridines can be acylated at the amino group in 2-position. Suitable acylating agents are halides, especially chlorides, or anhydrides of carboxylic acids, for example of aliphatic, aromatic, araliphatic, cycloaliphatic or cycloaliphatic-aliphatic carboxylic acids.

An acyl radical is in this connection above all an alkanoyl residue, in the first place a lower alkanoyl residue such as the acetyl residue or a benzoyl or phenylalkanoyl residue.

Furthermore, the conversion described above for substituents on aromatic residues may be carried out in similar manner, and/or in 7-unsubstituted pyridothieno-pyrimidines and/or in 6-unsubstituted thienopyridines unsubstituted or substituted hydrocarbon residues may be introduced, for example as described above, or eliminable substituents in the said positions may be eliminated, for example as described above.

The resolution of a possibly obtained racemate mixture and/or racemate may be performed as described above.

Compounds containing basic groups may be obtained in free form or in form of their acid addition salts. Free compounds and salts can be converted one into the other as described above.

The new starting materials, especially those containing the 5,6,7,8-tetrahydro-pyrido[4',3':4,5]thieno[2,3-d]-pyrimidine or 4,5,6,7-tetrahydro-thieno[2,3-c]pyridine structure possess valuable properties and are likewise included in the present invention.

Thus, for example, the corresponding 2-amino-3-Y''-4,5,6,7-tetrahydro-thieno[2,3-c]pyridines, in which Y'' represents a free or esterified carboxyl group, a carbamyl group or a cyano group, and their N$^2$-acyl derivatives, possess valuable pharmacological properties; in addition to an antihypertensive effect they have an antiexudative activity as can be shown in animal tests, for example on oral administration of a dose from 30 to 100 mg./kg. to rats. The new compounds mentioned above are therefore useful as antiphlogistics.

An esterified carboxyl group is especially a carboxyl group esterified with an aliphatic alcohol such as a lower alkanol or alkenol, for example methanol, ethanol, propanol, isopropanol, allyl alcohol, methallyl alcohol, butanol, secondary butanol, isobutanol or amyl alcohol, or with a cycloaliphatic alcohol such as cycloalkanol, for example cyclopentanol or cyclohexanol, or with a cycloaliphatic-aliphatic alcohol such as a cycloalkyl-lower alkanol, for example a cyclopentyl- or cyclohexyl-methanol-, -ethanol or -propanol, or with an araliphatic alcohol such as a benzyl alcohol or 1- or 2-phenylethanol whose aromatic nucleus may be substituted, especially by lower alkyl residues, for example methyl, ethyl, propyl, isopropyl, butyl, isobutyl or amyl residues, lower alkoxy groups, for example methoxy, ethoxy, propoxy, isopropoxy, butoxy or amyloxy groups, halogen atoms, for example fluorine, chlorine or bromine atoms and/or trifluoromethyl groups.

Of special value among the new compounds are those of the general formulas

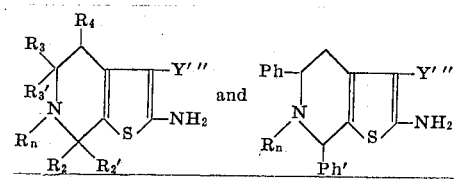

in which R$_2$, R'$_2$, R$_3$, R'$_3$, R$_4$, R$_n$, Ph and Ph' have the above-mentioned general and preferred meanings, and Y''' represents a free carboxyl group, the cyano group, the carbamyl group or a lower carbalkoxy group, and its N$^2$-lower alkanoyl derivatives, especially the carbomethoxy or carbethoxy group, and especially the 2-amino-3-carboxy-6-benzyl-4,5,6,7-tetrahydro-thieno[2,3-c]pyridine and above all the 2-amino-3-carboxy-6-methyl-4,5,6,7-tetrahydro-thieno[2,3-c]pyridine which, for example on oral administration of a dose of 30 mg./kg. to rats produces a distinct kaolin-oedema-inhibiting effect.

The corresponding 4-halogeno-5,6,7,8-tetrahydro-pyrido[4',3'4,5]thieno[2,3-d]pyrimidines, in which the halogen atom in position 4 is preferably a bromine or particularly a chlorine atom, possess bactericidal and fungicidal properties and may be used as bactericides or fungicides.

Especially valuable are the compounds of the formulas

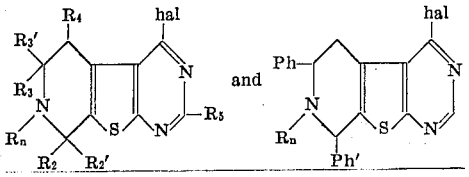

in which $R_2$, $R'_2$, $R_3$, $R'_3$, $R_4$, $R_5$, $R_n$, Ph and Ph' have the above-mentioned general and preferred meanings and hal stands for bromine or especially chlorine, and more especially the cis-4-chloro-6,8-diphenyl-7-methyl-5,6,7,8-tetrahydro-pyrido[4',3':4,5]thieno[2,3-d]pyrimidine.

The new pharmacologically active compounds can be used, for example, in form of pharmaceutical preparations containing them in free form or, if desired, in form of their salts, especially of the therapeutically acceptable salts, in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example tablets, dragees, capsules or suppositories, or in liquid form solutions (for example elixirs or syrups), suspensions or emulsions. They may be sterilized and/or contain assistants such as preserving, stabilizing, wetting or emulsifying agents, solubilizers, salts for regulating the osmotic pressure or salts. They may also contain further therapeutically valuable substances. The pharmaceutical preparations are formulated by conventional methods.

The new compounds may also be used in veterinary medicine, for example in one of the forms mentioned above or in form of animal fodder or additives to animal fodder, using, for example, the conventional extenders and diluents and fodders respectively.

The compounds having bactericidal and fungicidal activity may be used as disinfectants or preservatives, for example for disinfecting the skin, instruments, bandages, underwear or the like, and also for disinfecting or preserving victuals or animal fodders. They may be used as such or in admixture with the usual extenders or excipients.

The following examples illustrate the invention.

EXAMPLE 1

A mixture of 4.8 g. of 4-chloro-7-methyl-5,6,7,8-tetrahydro-pyrido[4',3':4,5]thieno[2,3-d]pyrimidine and 25 ml. of β-diethylamino-ethylamine is stirred and heated for 5 hours at 100° C. The reaction solution is evaporated to dryness. The partially crystalline residue is boiled with 300 ml. of petroleum ether. From the fraction soluble in petroleum ether 4-(β-diethylamino-ethylamino)-7-methyl-5,6,7,8-tetrahydro-pyrido[4',3':4,5]thieno[2,3-d]pyrimidine of the formula

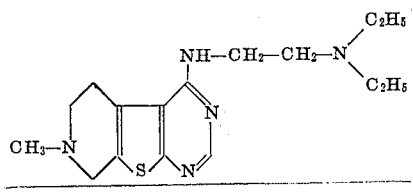

crystallizes out and melts at 81°–83° C. After recrystallization from petroleum ether the melting point rises to 87°–89° C.

An ethanolic solution of 190 mg. of the above base is mixed with 0.6 ml. of 2N-ethanolic hydrochloric acid. Acetone is added and the precipitated crystals are suctioned off, to yield the dihydrochloride of 4-(β-diethylamino-ethylamino)-7-methyl-5,6,7,8-tetrahydro-pyrido[4',3':4,5]thieno[2,3-d]pyrimidine melting at 259°–262° C.

The 4-chloro-7-methyl-5,6,7,8-tetrahydro-pyrido[4',3':4,5]thieno[2,3-d]pyrimidine, used as starting material, is prepared in the following manner:

While stirring a mixture of 56.5 g. of 1-methyl-piperidone-(4), 42 g. of cyanoacetamide and 17.5 g. of sulfur in 150 ml. of ethanol 50 ml. of morpholine is dropped in. The batch is then heated for 3 hours in oil bath at 45° C., kept overnight, the reaction mixture is cooled with ice and the crystals are suctioned off, to yield 2-amino-3-carbamyl-6-methyl-4,5,6,7-tetrahydro-thieno[2,3-c]pyridine melting at 187°–190° C.

12.6 grams of the above amide are dissolved in hot ethanol and mixed with 29 ml. of 2.1N-ethanolic hydrochloric acid, then cooled and suctioned to furnish the hydrochloride of 2-amino-3-carbamyl-6-methyl-4,5,6,7-tetrahydro-thieno[2,3-c]pyridine melting at 221° C.

Thirty-six grams of 2-amino-3-carbamyl-6-methyl-4,5,6,7-tetrahydro-thieno[2,3-c]pyridine in 200 ml. of formamide are heated for 5 hours in an oil bath at 175°–180° C., then cooled with ice and the precipitated crystals are suctioned off and washed with a small quantity of ethanol, acetone and ether, to furnish 4-hydroxy-7-methyl-5,6,7,8-tetrahydro-pyrido[4',3':4,5]thieno[2,3-d]pyrimidine melting at 224°–226° C.

A solution of 14.7 g. of the above base in 340 ml. of absolute ethanol is mixed with 33.5 ml. of 2N-ethanolic hydrochloric acid. The precipitated crystals are suctioned off, recrystallized from aqueous ethanol and the crystals are washed with ethanol and ether, to furnish 4-hydroxy-7-methyl-5,6,7,8-tetrahydro-pyrido[4',3':4,5]thieno[2,3-d]pyrimidine hydrochloride hydrate melting at 315°–317° C.

Thirteen grams of 4-hydroxy-7-methyl-5,6,7,8-tetrahydro-pyrido[4'c':4,5]thieno[2,3-d]pyrimidine hydrochloride hydrate in 200 ml. of phosphorus oxychloride are refluxed for 2½ hours. The solid material is suctioned off, dissolved in 400 ml. of hot water and filtered. The filtrate is adjusted to a pH value of 7.5 with 2N-sodium hydroxide solution, the precipitated crystals are suctioned off and recrystallized from aqueous methanol, to yield 4-chloro-7-methyl-5,6,7,8-tetrahydro-pyrido[4',3':4,5]thieno[2,3-d]pyrimidine melting at 112°–114° C.

A solution of 15 g. of the above base in 200 ml. of absolute ethanol is mixed with 31.4 ml. of 2N-ethanolic hydrochloric acid. After cooling, the precipitated crystals are suctioned off and washed with acetone, to yield the monohydrochloride of 4-chloro-7-methyl-5,6,7,8-tetrahydro-pyrido[4',3':4,5]thieno[2,3-d]pyrimidine melting at 324° C. with decomposition.

For the condensation leading to the pyrimidine ring the compounds manufactured in the following manner may be used:

Two hundred ml. of morpholine are stirred dropwise into a suspension of 226 g. of 1-methyl-piperidone-(4), 226 g. of ethyl cyanoacetate and 70 g. of sulfur in 600 ml. of absolute ethanol at a rate such that the temperature does not rise above 60° C., and the batch is then stirred on for 3 hours at an internal temperature of 40° C. After cooling, the crystals are suctioned off, dissolved in chloroform, mixed with petroleum ether and the precipitated crystals are suctioned off, to yield 2-amino-3-carbethoxy-6-methyl-4,5,6,7-tetrahydro-thieno[2,3-c]pyridine melting at 101° to 102° C.

A solution of 0.287 g. of the above base in 4 ml. of ethanol is mixed with 1.2 ml. of ethanolic hydrochloric acid, then cooled, and the precipitated crystals are suctioned off, to yield the hydrochloride of 2-amino-3-carbethoxy-6-methyl-4,5,6,7-tetrahydro-thieno[2,3-c]pyridine melting at 243°–245° C.

A mixture of 12 g. of 2-amino-3-carbethoxy-6-methyl-4,5,6,7-tetrahydro-thieno[2,3-c]pyridine, 70 ml. of methanol and 70 ml. of 2N-sodium hydroxide solution is boiled for 30 minutes under reflux, concentrated under vacuum, neutralized with 2N-hydrochloric acid and the precipitated crystals are suctioned off, to yield 2-amino-3-carboxy-6-methyl-4,5,6,7-tetrahydro-thieno[2,3-c]pyridine melting at 169° C. with decomposition.

EXAMPLE 2

Seventeen grams of crude cis-4-chloro-6,8-bis-(p- chlorophenyl)-7-methyl-5,6,7,8-tetrahydro-pyrido[4',3':4.5]thieno[2,3-d]pyrimidine hydrochloride are added to 70 ml. of β-diethylamino-ethylamine. The mixture is refluxed for 15 minutes and then evaporated to dryness. The residue is digested with 95 percent ethanol and the crystals are suctioned off, to yield cis-4-(β-diethylamino-ethylamino)-6,8-bis-(p-chlorophenyl)-7-methyl-5,6,7,8-tetrahydro-pyrido[4',3':4,5]thieno[2,3-d]pyrimidine of the formula

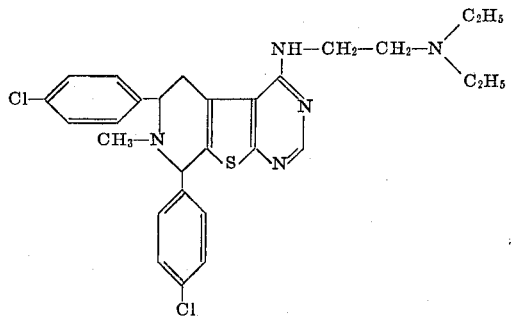

melting at 177°–179° C. After recrystallization from methylene-chloride+ethanol it melts at 179°–181° C.

Five hundred forty mg. of the above base are suspended with heating in 5 ml. of methanol and mixed with 1.1 ml. of 2N-ethanolic hydrochloric acid. On addition of ether crystallization sets in. The crystals are suctioned off and recrystallized from ethanol+ether, to yield the dihydrochloride of cis-4-(β-diethylaminoethylamino)-6,8-bis-(p-chlorophenyl)-7-methyl-5,6,7,8-tetrahydro-pyrido[4',3':4,5]thieno[2,3-d]pyrimidine melting at 240°–245° C. with decomposition.

The cis-4-chloro-6,8-bis-(p-chlorophenyl)-7-methyl-5,6,7,8-tetrahydro-pyrido[4',3':4.5]thieno[2,3-d]pyrimidine used as starting material is prepared thus:

Thirty grams of glacial acetic acid in 50 ml. of absolute ethanol are dropped at −20° C. into 61 ml. of 8.2N-ethanolic methylamine solution. While cooling the methylamine acetate solution well, it is mixed with a mixture of 29 g. of acetone and 140.5 g. of p-chlorobenzaldehyde and the whole is stirred for 7 hours at room temperature. The precipitated crystals are suctioned off, washed with ethanol, to yield 1-methyl-2,6-bis-(p-chlorophenyl)-piperidone-(4) melting at 142° C.

A suspension of 500 g. of 1-methyl-2,6-bis-(p-chlorophenyl)-piperidone-(4), 126 g. of cyanoacetamide and 48 g. of sulfur in 3 liters of absolute ethanol is mixed with 150 ml. of morpholine and the whole is stirred and refluxed for 2 hours, then cooled, and the crystals are suctioned off and washed with ethanol and ether, to yield cis-2-amino-3-carbamyl-5,7-bis-(p-chlorophenyl)-6-methyl-4,5,6,7-tetrahydro-thieno[2,3-c]pyridine melting at 236° C.

A mixture of 179 g. of cis-2-amino-3-carbamyl-5,7-bis-(p-chlorophenyl)-6-methyl-4,5,6,7-tetrahydro-thieno[2,3-c]pyridine, 1,030 ml. of acetic anhydride and 1,030 ml. of orthoformic acid ethyl ester is refluxed for 10 hours, then concentrated to dryness, the residue is boiled for 10 minutes with 1.5 liters of ethanol and after cooling the crystals are suctioned off, to furnish 4-hydroxy-6,8-bis-(p-chlorophenyl)-7-methyl-5,6,7,8-tetrahydro-pyrido[4',3':4,5]thieno[2,3-d]pyrimidine melting at 301°–304° C.

A mixture of 15 g. of 4-hydroxy-6,8-bis-(p-chlorophenyl)-7-methyl-5,6,7,8-tetrahydro-pyrido[4',3':4,5]thieno[2,3-d]pyrimidine and 450 ml. of phosphorus oxychloride is refluxed for 3½ hours, then kept for 12 hours at room temperature and the precipitated crystals are suctioned off and washed with acetone and petroleum ether, to furnish the crude hydrochloride of 4-chloro-6,8-bis-(p-chlorophenyl)-7-methyl-5,6,7,8-tetrahydro-pyrido[4',3':4,5]thieno[2,3-d]pyrimidine. To liberate the base the hydrochloride is mixed with water and an equal volume of saturated sodium carbonate solution, extracted with chloroform, the chloroform solution is evaporated and the residue triturated with a small quantity of absolute ethanol, to furnish the free base melting at 148°–150° C.

EXAMPLE 3

19.5 grams of cis-4-chloro-6,8-bis-phenyl-7-methyl-5,6,7,8-tetrahydro-pyrido[4',3':4,5]thieno[2,3-d]pyrimidine in 100 ml. of β-diethylamino-ethylamine are refluxed for 15 minutes, then evaporated to dryness under vacuum, 50 ml. of absolute ethanol are added, and the crystals are suctioned off and recrystallized from methylenechloride+petroleum ether, to yield cis-4-(β-diethylamino-ethylamino)-6,8-bis-phenyl-7-methyl-5,6,7,8-tetrahydro-pyrido[4',3':4,5]thieno[2,3-d]pyrimidine of the formula

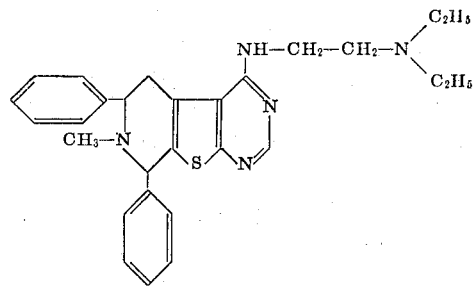

melting at 172°–173.5° C.

The cis-4-chloro-6,8-bis-phenyl-7-methyl-5,6,7,8-tetrahydro-pyridol[4',3':4,5]thieno[2,3-d]pyrimidine used as starting material is prepared thus:

Sixty grams of glacial acetic acid in 100 ml. of absolute ethanol are dropped at −20° C. into 134 ml. of 8.2N-ethanolic methylamine solution. While cooling this methylamine acetate solution well, 212 g. of benzaldehyde and 58 g. of acetone are added and the batch is stirred for 1 hour at 0° C. and then for 2 hours at room temperature. The precipitated crystals are suctioned off, thoroughly washed with ethanol and recrystallized from methylenechloride+ether, to furnish 1-methyl-2,6-bis-phenyl-piperidone-(4) melting at 151°–153° C.

A suspension of 13 g. of 1-methyl-2,6-bis-phenyl-piperidone-(4), 4.2 g. of cyanoacetamide and 1.8 g. of sulfur in 100 ml. of absolute ethanol is mixed with 5 ml. of morpholine and the whole is refluxed for 1½ hours, then cooled, and the precipitated crystals are suctioned off, washed with cold ethanol and recrystallized from chloroform+petroleum ether, to furnish cis-2-amino-3-carbamyl-5,7-bis-phenyl-6-methyl-4,5,6,7-tetrahydro-thieno[2,3-c]pyridine melting at 203°–205° C.

A mixture of 145 g. of cis-2-amino-3-carbamyl-5,7-bis-phenyl-6-methyl-4,5,6,7-tetrahydro-thieno[2,3-c]pyridine, 1 liter of orthoformic acid ester and 1 liter of acetic anhydride is refluxed for 4 hours, then evaporated to dryness, the residue is stirred with 400 ml. of absolute ethanol and the crystals are suctioned off and recrystallized from dimethylformamide, to furnish 4-hydroxy-6,8-bis-phenyl-7-methyl-5,6,7,8-tetrahydro-pyrido[4',3':4,5]thieno[2,3-d]pyrimidine melting at 288°–291° C.

One hundred four grams of 4-hydroxy-6,8-bis-phenyl-7-methyl-5,6,7,8-tetrahydro-pyrido[4',3':4,5]thieno[2,3-d]pyrimidine in 1.5 liters of phosphorus oxychloride are refluxed for 4 hours, then the reaction solution is evaporated to dryness and the residue is stirred with 800 g. of ice water. The solid phase is suctioned off, stirred with ethanol and the crystals are suctioned off, finely powdered and suspended in water. This suspension is mixed with saturated sodium carbonate solution and extracted with chloroform. The chloroform extract is dried and evaporated. The residue is recrystallized from a small quantity of absolute ethanol, to furnish cis-4-chloro-6,8-bis-phenyl-7-methyl-5,6,7,8-tetrahydro-pyrido[4',3':4,5]thieno[2,3-d]pyrimidine melting at 156°–157° C.

EXAMPLE 4

A mixture of 4 g. of cis-4-chloro-6,8-bis-phenyl-7-methyl- 5,6,7,8-tetrahydro-pyrido[4',3':4,5]thieno[2,3-d]pyrimidine and 20 ml. of β-dimethylamino-ethylamine is refluxed for 15 minutes, then evaporated to dryness under vacuum and the residue is recrystallized from methanol, to furnish cis-4-(β-dimethylamino-ethylamino)-6,8-bis-phenyl-7-methyl-5,6,7,8-tetrahydro-pyrido[4',3':4,5]thieno[2,3-d]pyrimidine of the formula

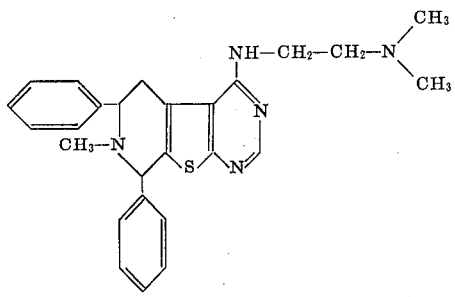

melting at 190°–191° C.

EXAMPLE 5

Twenty grams of cis-4-chloro-6,8-bis-(para-chlorophenyl)-7-methyl-5,6,7,8-tetrahydro-pyrido[4',3':4,5]thieno[2,3-d]pyrimidine are boiled under reflux in 70 ml. of dimethylamino-ethylamine for 10 minutes. The reaction mixture is then evaporated to dryness, the residue digested in ethanol of 95 percent strength, and the precipitated crystals filtered with suction. After recrystallization from a mixture of methylene chloride and ethanol, there is obtained cis-4-(β-dimethylamino-ethylamino)-6,8-bis-(para-chlorophenyl)-7-methyl-5,6,7,8-tetrahydro-pyrido[4',3':4,5]thieno[2,3-d]pyrimidine of the formula

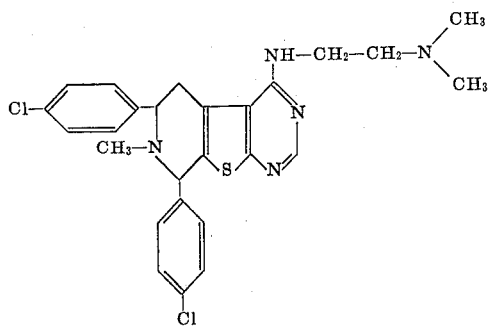

melting at 180°–182° C.

EXAMPLE 6

Ten grams of cis-4-chloro-6,8-bis-(paracholopheny)-7-methyl-5,6,7,8-tetrahydro-pyrido[4',3':4,5]thieno[2,3-d]pyrimidine are dissolved in 35 ml. of β-morpholino-ethylamine and heated for 15 minutes at 145° C. internal temperature. After cooling, 50 ml. of ethanol of 95 percent strength are added, and the precipitated crystals are filtered with suction. After recrystallization from a mixture of methylene chloride and petroleum ether there is obtained cis-4-(β-morpholinoethylamino)-6,8-bis-(parachlorophenyl)-7-methyl-5,6,7,8-tetrahydro-pyrido-[4',3':4,5]thieno[2,3-d]pyrimidine of the formula

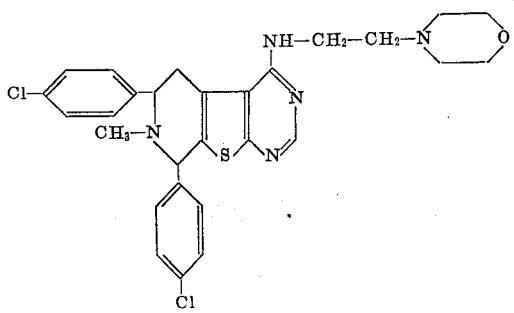

melting at 196°–197° C.

EXAMPLE 7

Eight grams of cis-4-chloro-6,8-bis-(parachlorophenyl)-7-methyl-5,6,7,8-tetrahydro-pyrido[4',3':4.5]thieno[2,3-d]pyrimidine are heated for 15 minutes at 145° C. in a previously heated oil bath with 30 ml. of N,N,N'-triethyl-ethylene-diamine. After cooling, 40 ml. of ethanol are added and the precipitated crystals are filtered with suction. There is obtained cis-4-[N-(β-diethylaminoethyl)-ethylamino]-6,8-bis-(parachlorophenyl)-7-methyl-5,6,7,8-tetrahydro-pyrido[4',3':4,5]thieno[2,3-d]pyrimidine of the formula

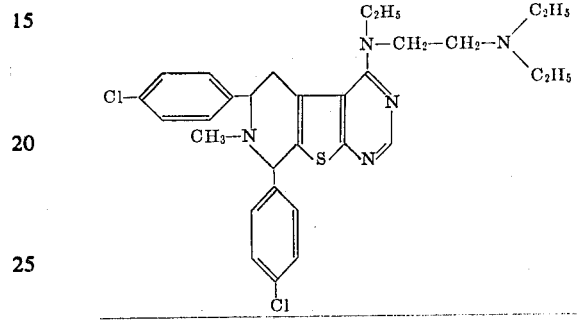

melting at 153°–154° C.

EXAMPLE 8

By reacting 4-chloro-7-isopropyl-5,6,7,8-tetrahydro-pyrido[4'c':4,5]thieno[2,3-d]pyrimidine with β-dimethylamino-ethylamine in an analogous manner to that described in the preceding examples there is obtained 4-(β-dimethylamino-ethylamino)-7-isopropyl-5,6,7,8-tetrahydro-pyrido[4',3':4,5]thieno[2,3-d]pyrimidine of the formula

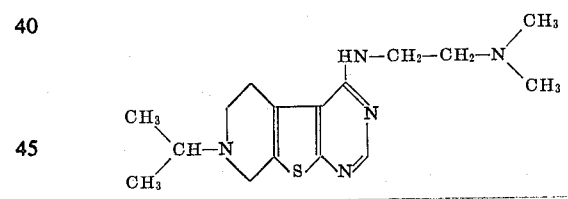

The 4-chloro-7-isopropyl-5,6,7,8-tetrahydro-pyrido-[4',3':4,5]thieno[2,3-d]pyrimidine used as starting material may be prepared as follows:

Ten ml. of morpholine are added dropwise to a suspension of 14.1 g. of 1-isopropyl-piperidone-(4), 8.4 g. of cyanacetamide and 3.5 g. of sulfur in 30 ml. of absolute ethanol. Stirring is continued at 40° C. for 3 hours and at 60° C. for 4 hours. After cooling, the reaction product is treated with 250 ml. of water, and extracted with chloroform. The chloroformic solution is washed with water, dried over sodium sulfate and evaporated. The residue is boiled with 400 ml. of ether, the ethereal solution filtered and the filtrate concentrated to a great extent, whereupon 2-amino-3-carbamyl-6-isopropyl-4,5,6,7-tetrahydro-thieno[2,3-c]pyridine precipitates. After recrystallization from ether+petroleum ether it melts at 112°–114° C.

By reacting this amide with formamide in a manner analogous to that described in the preceding examples there is obtained 4-hydroxy-7-isopropyl-5,6,7,8-tetrahydro-pyrido[4',3':4,5]thieno[2,3-d]pyrimidine.

The conversion of this compound into the hydrochloride and reaction of the latter with phosphorus oxychloride in a manner analogous to that described in the preceding examples yields 4-chloro-7-isopropyl-5,6,7,8-tetrahydro-pyrido[4',3':4,5]thieno[2,3-d]pyrimidine which can be converted into the hydrochloride in the conventional manner.

The above-described 2-amino-3-carbamyl-6-isopropyl-4,5,6,7-tetrahydro-thieno[2,3-c]pyridine may also be obtained by hydrolyzing the corresponding 3-cyano compound. The latter may be prepared, for example, as follows:

Twenty ml. of morpholine are added dropwise with stirring to 28 g. of 1-isopropyl-piperidone-(4), 13.2 g. of malodinitrile and 7 g. of sulfur in 60 ml. of absolute ethanol. After the addition of the morpholine, stirring is continued for 3 hours at 40° C. The precipitated crystals are filtered with suction and recrystallized from isopropanol. There is obtained 2-amino-3-cyano-6-isopropyl-4,5,6,7-tetrahydro-thieno[2,3-c]pyridine melting at 174°–175° C.

15.5 g. of the above base are dissolved in hot ethanol, and 70 ml. of N ethanolic hydrochloric acid are then added. The precipitated crystals are filtered with suction and recrystallized from a mixture of ethanol and water, to yield the hydrochloride of 2-amino-3-cyano-6-isopropyl-4,5,6,7-tetrahydro-thieno[2,3-c]pyridine melting at 222°–223° C.

EXAMPLE 9

By reacting 4-chloro-7-isopropyl-5,6,7,8-tetrahydro-pyrido[4'c':4,5]thieno[2,3-d]pyrimidine with β-pyrrolidino-ethylamine in a manner analogous to that described in the preceding examples there is obtained 4-(β-pyrrolidinoethyl-amino)-7-isobutyl-5,6,7,8-tetrahydro-pyrido[4',5':4,5]thieno[2,3-d]pyrimidine of the formula

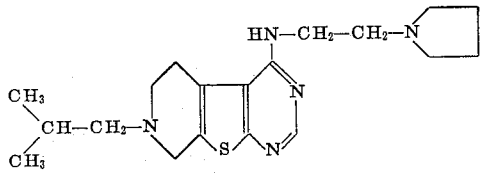

The 4-chloro-7-isobutyl-5,6,7,8-tetrahydro-pyrido-[4',3':4,5]thieno[2,3-d]pyrimidine used as starting material may be prepared as follows:

Twenty ml. of morpholine are added dropwise and with stirring to a suspension of 31 g. of 1-isobutyl-piperidone-(4), 13.2 g. of malodinitrile and 7 g. of sulfur in 60 ml. of absolute ethanol; the whole is then stirred for 3 hours at 40° C. After cooling, the reaction product is filtered with suction, dissolved with heating in absolute ethanol, and ethanolic hydrochloric acid is then added. After cooling with ice water, the crystals are filtered with suction and recrystallized from ethanol, to yield 2-amino-3-cyano-6-isobutyl-4,5,6,7-tetrahydro-thieno[2,3-c]pyridine hydrochloride hydrate melting at 208°–209° C.

By hydrolyzing the nitrile to the corresponding amide and reacting the latter with formamide in a manner analogous to that described in the preceding examples there is obtained 4-hydroxy-7-isobutyl-5,6,7,8-tetrahydro-pyrido[4',3':4,5]thieno[2,3-d]pyrimidine.

The conversion of this compound into the hydrochloride and reaction of the latter with phosphorus oxychloride in a manner analogous to that described in the preceding examples yield 4-chloro-7-isobutyl-5,6,7,8-tetrahydro-pyrido[4',3':4,5]thieno[2,3-d]pyrimidine which can be converted into the hydrochloride in the customary manner.

For the condensation to the pyrimidine ring the compound prepared as follows may also be used:

Seventeen ml. of morpholine are added dropwise and with stirring to a suspension of 18.5 g. of 1-isobutyl-piperidone-(4), 13.5 g. of ethyl cyanoacetate and 4.17 g. of sulfur in 30 ml. of absolute ethanol, and stirring is continued for 3 hours at 40° C. The reaction mixture is poured into water and the precipitated crystals filtered with suction and recrystallized from a mixture of ethanol and water. Fifteen grams of the resulting crystals are dissolved in absolute ethanol with heating and treated with 53 ml. of N ethanolic hydrochloric acid, the hydrochloride of 2-amino-3-carbethoxy-6-isobutyl-4,5,6,7-tetrahydro-thieno[2,3-c]pyridine melting at 205°–206° C. precipitating.

EXAMPLE 10

By reacting 4-chloro-7-secondary butyl-5,6,7,8-tetrahydro-pyrido[4',3':4,5]thieno[2,3-d]pyrimidine with ε-piperidinopentylamine in a manner analogous to that described in the preceding examples there is obtained 4-(ε-piperidinopentylamino)-7-secondary butyl-5,6,7,8-tetrahydro-pyrido[4',3':4,5]thieno[2,3-d]pyrimidine of the formula

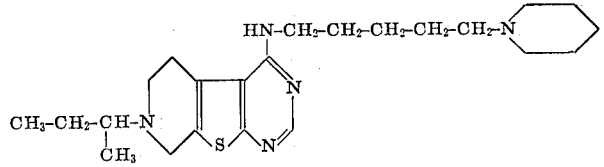

The 4-chloro-7-secondary butyl-5,6,7,8-tetrahydro-pyrido[4',3':4,5]thieno[2,3-d]pyrimidine used as starting material may be prepared as follows:

Ten ml. of morpholine are added dropwise and with stirring to a suspension of 15.5 g. of 1-secondary butyl-piperidone-(4), 8.4 g. of cyanacetamide and 3.5 g. of sulfur in 30 ml. of absolute ethanol. Stirring is continued for 3 hours at 40° C. and for 4 hours at 60° C. After cooling, 300 ml. of water are added. After some time a resinous product and yellow crystals precipitate. The crystals are separated and dissolved in ether. The ether solution is purified with animal carbon, filtered and petroleum ether is added, 2-amino-3-carbamyl-6-secondary butyl-4,5,6,7-tetrahydro-thieno[2,3-c]pyridine, melting at 127°–129° C., precipitating.

By reacting this amide with formamide in a manner analogous to that described in the preceding examples there is obtained 4-hydroxy-7-secondary butyl-5,6,7,8-tetrahydro-pyrido[4',3':4,5]thieno[2,3-d]pyrimidine.

The conversion of this compound into the hydrochloride and the reaction of the latter with phosphorus oxychloride in a manner analogous to that described in the preceding examples yields 4-chloro-7-secondary butyl-5,6,7,8-tetrahydro-pyrido[4',3':4,5]thieno[2,3-d]pyrimidine which may be converted into the hydrochloride in the conventional manner.

For condensation to the pyrimidine ring the compound prepared in the following manner may also be used:

Twenty ml. of morpholine are added dropwise and with stirring to a suspension of 31 g. of 1-secondary butyl-piperidone-(4), 22.6 g. of ethyl cyanoacetate and 7 g. of sulfur in 60 ml. of ethanol; stirring is then continued for 15 minutes at 40° C. The reaction solution is poured into water and the supernatant water decanted from the precipitated oil. On the addition of a little methanol, crystallization sets in. The crystals are filtered with suction and recrystallized from a mixture of ethanol and water. Twenty g. of the resulting base are dissolved with heating in ethanol and treated with 35.5 ml. of 2N ethanolic hydrochloric acid, the hydrochloride of 2-amino-3-carbethoxy-6-secondary butyl-4,5,6,7-tetrahydro-thieno[2,3-c]pyrimidine, melting at 195°–197° C., crystallizing out.

The above-described 2-amino-3-carbamyl-6-secondary butyl-4,5,6,7-tetrahydro-thieno[2,3-c]pyridine may also be obtained by hydrolyzing the corresponding 3-cyano compound. The latter may be prepared, for example, as follows:

Ten ml. of morpholine are added dropwise and with stirring to a suspension of 15.5 g. of 1-secondary butyl-piperidone-(4), 6.6 g. of malodinitrile and 3.5 g. of sulfur in 30 ml. of absolute ethanol. After the addition is complete, stirring is continued for 3 hours at 40° C. After cooling, the precipitated material is filtered with suction, dissolved in 2N hydrochloric acid and extracted with chloroform. The acidic aqueous phase is rendered alkaline and extracted with chloroform. The dried chloroform solution is evaporated. The resulting residue is recrystallized from a mixture of chloroform and petroleum ether and with water, to yield 2-amino-3-cyano-6-secondary butyl-4,5,6,7-tetrahydro-thieno[2,3-c]pyridine melting at 124°–126° C.

EXAMPLE 11

By reacting 4-chloro-7-benzyl-5,6,7,8-tetrahydro-pyrido[4'c':4,5]thieno[2,3-d]pyrimidine with η-dimethylaminopropylamine in a manner analogous to that described in the preceding examples there is obtained 4-(γ-dimethylaminopropylamino- 7-benzyl-5,6,7,8-tetrahydro-pyrido[4',3'4,5]thieno[2,3-d]pyrimidine of the formula

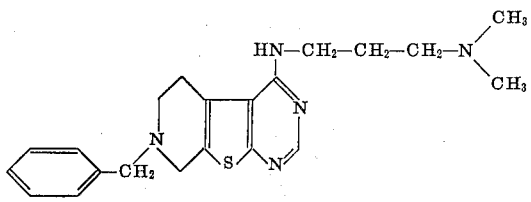

The 4-chloro-7-benzyl-5,6,7,8-tetrahydro-pyrido[4',3':4,5]thieno[2,3-d]pyrimidine used as starting material may be prepared as follows:

Fifty ml. of morpholine are added dropwise and with stirring to a suspension of 95 g. of 1-benzyl-piperidone-(4), 42 g. of cyanacetamide and 16 g. of sulfur in 200 ml. of absolute ethanol, and the whole is then stirred for 4 hours at a bath temperature of 60° C. After cooling, the reaction solution is poured into 1,000 ml. of water, a resinous precipitate settling out. The supernatant water is decanted and the residue is treated with water and 2N hydrochloric acid. The undissolved powdery material is filtered with suction and boiled with methanol. As insoluble portion there is obtained the hydrochloride of 2-amino-3-carbamyl-6-benzyl-4,5,6,7-tetrahydro-thieno[2,3-c]pyridine melting at 226° C. (with decomposition). By the addition of ether a further hydrochloride can be isolated from the filtrate.

By reacting this amide with formamide in a manner analogous to that described in the preceding examples there is obtained 4-hydroxy-7-benzyl-5,6,7,8-tetrahydro-pyrido[4',3':4,5]thieno[2,3-d]pyrimidine.

The conversion of this compound into the hydrochloride and reaction of the latter with phosphorus oxychloride in a manner analogous to that described in the preceding examples yield 4-chloro-7-benzyl-5,6,7,8-tetrahydro-pyrido[4',3':4,5]thieno[2,3-d]pyrimidine which can be converted into the hydrochloride in the ordinary manner.

For condensation to the pyrimidine ring the compounds prepared as follows may also be used:

Ten ml. of morpholine are added dropwise and with stirring to a suspension of 18.9 g. of 1-benzyl-piperidone-(4), 11.3 g. of ethyl cyanoacetate and 3.5 g. of sulfur in 30 ml. of absolute ethanol, and stirring is continued for 3 hours at a temperature of 40° C. After cooling in ice water, the reaction product crystallizes out; it is filtered with suction and recrystallized from isopropanol, to yield 2-amino-3-carbethoxy-6-benzyl-4,5,6,7-tetrahydro-thieno[2,3-c]pyridine melting at 112°-113.5° C.

1.5.8 g. of the above base are dissolved in hot ethanol and treated with 50 ml. of N ethanolic hydrochloric acid. The precipitated product is filtered with suction and recrystallized from ethanol, to yield the hydrochloride of 2-amino-3-carbethoxy-6-benzyl-4,5,6,7-tetrahydro-thieno[2,3-c]pyridine melting at 219°-222° C.

15.8 g. of 2-amino-3-carbethoxy-6-benzyl-4,5,6,7-tetrahydro-thieno[2,3-c]pyridine are refluxed for 3 hours in 70 ml. of methanol and 70 ml. of 2N-sodium hydroxide solution. The batch is then concentrated to half its volume and acidified with 2N-hydrochloric acid. The product is filtered off, stirred with 100 ml. of ethanol, and filtered with suction. There is obtained in this manner 2-amino-3-carboxy-6-benzyl-4,5,6,7-tetrahydro-thieno[2,3-c]pyridine hydrochloride melting at 200° C. (with decomposition).

The above-described 2-amino-3-carbamyl-6-benzyl-4,5,6,7-tetrahydro-thieno[2,3-c]pyridine may also be obtained by hydrolysis of the corresponding 3-cyano compound. The latter may be prepared, for example, as follows:

Ten ml. of morpholine are added dropwise and with stirring to a suspension of 18.9 g. of 1-benzyl-piperidone-(4), 6.6 g. of malodinitrile and 3.5 g. of sulfur in 30 ml. of ethanol, and stirring is continued for 15 minutes at 40° C. The crystalline reaction product is recrystallized from isopropanol to yield 2-amino-3-cyano-6-benyl-4,5,6,7-isopropanol to yield 2-amino-3-cyano-6-benzyl-4,5,6,7-tetrahydro-thieno[2,3-c]pyridine melting at 152°-153° C.

Fifteen g. of the above base are dissolved in ethanol with heating and treated with 51 ml. of N ethanolic hydrochloric acid, the hydrochloride of 2-amino-3-carbethoxy-6-benzyl-4,5,6,7-tetrahydro-thieno[2,3-c]pyridine, melting at 240°-241° C. (with decomposition), crystallizing out.

EXAMPLE 12

2.4 g. of 2,7-dimethyl-4-hydroxy-6,8-diphenyl-5,6,7,8-tetrahydro-pyrido[4',3':4,5]thieno[2,3-d]pyrimidine in 50 ml. of phosphorus oxychloride and 0.5 ml. of triethylamine are refluxed for 4 hours with stirring. The batch is then concentrated completely under reduced pressure, the residue dissolved in methylene chloride and the solution poured into ammoniacal ice water. The methylene chloride layer is separated and the aqueous phase extracted with methylene chloride. The extracts are combined, dried and evaporated. The residue contains 2,7-dimethyl-4-chloro-6,8-diphenyl-5,6,7,8-tetrahydro-pyrido[4',3':4,5]thieno[2,3-d]pyrimidine. It is refluxed for 10 minutes with 15 ml. of dimethylaminoethylamine. The batch is then evaporated in vacuo, and the residue treated with water. The crystals which precipitate are filtered with suction, dissolved in absolute ethanol and mixed with an excess of ethanolic hydrochloric acid. Ether is added, and the crystals which precipitate are filtered off with suction and recrystallized from ethanol+ether. There is obtained 2,7-dimethyl-4-(β-dimethylaminoethylamino)- 6,8-diphenyl-5,6,7,8-tetrahydro-pyrido[4',3':4,5]thieno[2,3-d]pyrimidine dihydrochloride of the formula

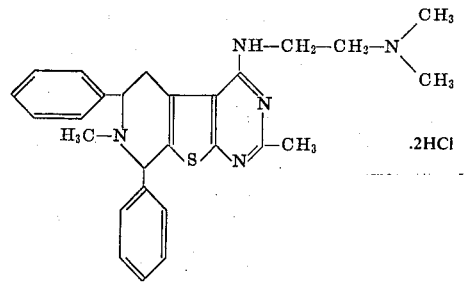

which melts at 215° C. under decomposition.

The 2,7-dimethyl-4-hydroxy-6,8-diphenyl-5,6,7,8-tetrahydro-pyrido[4',3':4,5]thieno[2,3-d]pyrimidine used as starting material can be prepared as follows:

72.7 g. of 2-amino-3-carbamyl-5,7-diphenyl-6-methyl-4,5,6,7-tetrahydro-thieno[2,3-c]pyridine are refluxed for 6 hours with 500 ml. of acetic anhydride. The batch is cooled to 0° C., and the crystals which precipitate are filtered off. The substance is split up chromatographically using a 1 kg. column of silica gel (Merk 0.05–0.2 mm.) using a 9:1 mixture of chloroform and ethyl acetate. The middle fractions are combined and recrystallized from methylene chloride+petroleum ether. There is obtained in this manner 2,7-dimethyl-4-hydroxy-6,8-diphenyl-5,6,7,8-tetrahydro-pyrido[4',3':4,5] thieno[2,3-d]pyrimidine which melts at 255°-256° C.

Other starting materials in which the free or esterified carboxyl group can be converted into the carbamyl group in the usual manner can be prepared, for example, as follows:

Ten ml. of acetyl chloride are stirred into 12 g. of 2-amino-3-carbethoxy-6-methyl-4,5,6,7-tetrahydro-thieno[2,3-c]pyridine in 30 ml. of glacial acetic acid, and stirring is continued for 10 minutes at 70° C. The reaction solution is concentrated, the residue dissolved in water, and the pH of the aqueous solution adjusted to 9 with saturated sodium carbonate solution. The precipitate which forms is filtered off with suction and recrystallized from chloroform+petroleum ether. 2-Acetylamino-3-carbethoxy-6-methyl-4,5,6,7-tetrahydro-thieno[2,3-c]pyridine is obtained which melts at 140°–142° C.

Fifteen g. of the above base are dissolved in 125 ml. of absolute ethanol and the solution treated with 53 ml. of N-ethanolic hydrochloric acid. On addition of ether and cooling with ice, the hydrochloride of 2-acetylamino-3-carbethoxy-6-methyl-4,5,6,7-tetrahydro-thieno[2,3-c]pyridine crystallizes. It melts at 204°–206° C.

Seven g. of acetylamino-3-carbethoxy-6-methyl-4,5,6,7-tetrahydro-thieno[2,3-c]pyridine are refluxed for 30 minutes with 35 ml. of 2N-sodium hydroxide solution and 35 ml. of methanol. The batch is then concentrated under a water-jet vacuum, and the residue is treated with 35 ml. of 2N-hydrocholoric acid. After some time, 2-acetylamino-3-carboxy-6-methyl-4,5,6,7-tetrahydro-thieno[2,3-c]pyridine crystallizes. It melts at 215°–218° C.

Fifteen g. of the above product are stirred with 40 ml. of aqueous 2N-hydrochloric acid. At first a clear solution is obtained, then crystallization sets in. The crystals are filtered off with suction, then recrystallized from water to obtain the hydrochloride of 2-acetylamino-3-carboxy-6-methyl-4,5,6,7-tetrahydro-thieno[2,3-c]pyridine melting at 274° C.

EXAMPLE 13

Tablets, each containing 100 mg. of the active substance, can be prepared, for example, from the following ingredients:

| Composition | per tablet |
|---|---|
| 4-(β-dimethylaminoethyl-amino)-6,8-bis-(para-chlorophenyl)-7-methyl-5,6,7,8-tetrahydro-pyrido [4′,3′:4′]thieno[-d]pyrimidine dihydrochloride | 100 mg. |
| lactose | 50 mg. |
| wheat starch | 74 mg. |
| colloidal silicic acid | 13 mg. |
| talc | 12 mg. |
| magnesium stearate | 1 mg. |
| | 250 mg. |

PREPARATION 4-(β-dimethylaminoethylamino)6,8-bis-(parachlorophenyl)-7-methyl-5,6,7,8-tetrahydro-pyrido[4′,3′:4,5]thieno-[2,3-d]pyrimidine dihydrochloride is mixed with the lactose, part of the wheat starch and with colloidal silicic acid, and the mixture forced through a sieve. Another portion of the wheat starch is pasted on a water bath with five times its quantity of water, and the powder mixture kneaded with the resulting paste until a slightly plastic mass is obtained. This mass is pressed through an approx. 3 mm. mesh sieve, dried and the resulting dry granulate passed through a sieve. The remainder of the wheat starch, the talc and the magnesium stearate are then admixed and the resulting mixture compressed into scored tablets each weighing 250 mg.

Tablets of this kind are suitable especially for therapeutic application.

EXAMPLE 14

Tablets, each containing 10 mg. of active principle, can be prepared, for example, from the following ingredients:

| Composition | per tablet |
|---|---|
| 4-(β-dimethylaminoethylamino)-6,8-bis-(para-chlorophenyl)-7-methyl-5,6,7,8-tetrahydro-pyrido [4′,3′:4′]thieno[-d]pyrimidine dihydrochloride | 10.0 mg. |
| wheat starch | 29.5 mg. |
| lactose | 50.0 mg. |
| colloidal silicic acid 5.0 mg. | |
| talc | 5.0 mg. |
| magnesium stearate | 0.5 mg. |

PREPARATION 4-(β-dimethylaminoethylamino)-6,8-bis-(parachlorophenyl)-7-methyl-5,6,7,8-tetrahydro-pyrido[4′,3′:4,5]thieno[ 2,3-d]pyrimidine dihydrochloride is mixed with part of the wheat starch, with lactose, and with colloidal silicic acid, and the mixture forced through a sieve. Another portion of the wheat starch is pasted on a water bath with five times its quantity of water, and the powder mixture kneaded with the resulting paste until a slightly plastic mass is obtained. This mass is pressed through an approx. 3 mm. mesh sieve, dried and the resulting dry granulate passed through a sieve. The remainder of the wheat starch, the talc and the magnesium stearate are then admixed and the resulting mixture compressed into tablets each weighing 100 mg.

Tablets of this kind are suitable especially for prophylactic administration.

EXAMPLE 15

According to the methods described herein, e.g. in an analogous manner to that described in examples 1 to 12, the following compounds can be prepared:

4-(β-dimethylaminoethylamino)-6,8-bis-(parafluorophenyl)-7-methyl-5,6,7,8-tetrahydro-pyrido[4′,3′:4,5]thieno[-d]pyrimidine, 4-(β-dimethylaminoethylamino)-6,8-bis-(parabromophenyl)-7-methyl-5,6,7,8-tetrahydro-pyrido[4′,3′:4,5]thieno[-d]pyrimidine, 4-(β-dimethylaminoethylamino)-6,8-bis-(parabromophenyl)-7-methyl-5,6,7,8-tetrahydro-pyrido[4′,3′:4,5]thieno[-d]pyrimidine, 4-(β-diallylaminoethylamino)-2-ethyl-5-methyl-6,8-bis-(2,4-dichlorophenyl)-5,6,7,8-tetrahydro-pyrido[4′,3′:4,5 ]thieno[2,3]pyrimidine, 4-(δ-pyrrolidinobutylamino)-2-cyclohexyl-5-methyl-6,8-bis-(ortho-tolyl)-7-allyl-5,6,7,8-tetrahydro-pyrido[4′,3′:4,5 ]thieno[2,3]pyrimidine, 4-(ε-piperidinopentylamino)-2-(cyclopentylmethyl)-5-phenethyl-6,8-bis-(meta-ethoxyphenyl)-7-cyclopentyl-5,6,7,8tetrahydro-pyrido[ 4′,3′:4,5]thieno[2,3-d]pyrimidine, 2,7-dimethyl-4-(β-dimethylaminoethylamino)-6,8-bis-(parachlorophenyl)5,6,7,8--tetrahydro-pyrido[4′,3′ :4,5]thieno[c2,3-d]pyrimidine, 4-[γ-(N′-methylpiperazino)-propylamino]-5-(paratrifluoromethylphenyl)-6,8-dimethyl-7-(parachlorobenzyl)-5,6,7,8-tetrahydro-pyrido[4′,3′:4,5]thieno[2,3-d]pyrimidine, 4-[β-(N′-β-hydroxyethylpiperazino)-ethylamino]-2-allyl-5-(parahydroxyphenethyl)-6,8-bis-(paranitrophenyl)-7-(metamethoxyphenyl)-5,6,7,8-tetrahydro-pyrido 4′,3′:4,5 ]thieno[2,3-d]pyrimidine, 4-[N-(β-ethylaminoethyl)-ethylamino]-2-(4-methylcycloheptyl)-6,8-bis-(metaacetylaminophenyl)-7-(cycloheptylmethyl)-5,6,7,8-tetrahydro-pyrido[4′,3′:4,5]thieno[2,3-d]pyrimidine, 4-[β-(3-methyl-1,2,5,6-tetrahydro-1-pyridyl)-ethylamino]-2-( 3methyl-cyclopentylmethyl)-5-(orthobewzoyloxy-phenyl)-6,8-bis-(orthoaminophenylpropyl)-7-ethyl-5,6,7,8-tetrahydro-pyrido[4′,3′:4,5]thieno[2,3-d]pyrimidine, 4-(β-diethylaminopropyl)-2-(orthoacetoxy-benzyl)-5-(metatrifluoromethylphenyl)-6,8-bis-(orthoacetoxybenzyl)-7-methallyl-5,6,7,8-tetrahydro-pyrido[4′,3′:4,5]thieno[2,3-d ]pyrimidine, 4-(β-dimethylaminoethylamino)-6,8-bis-(3,4-methylenedioxyphenyl)-7-(3,4,5-trimethoxybenzyl)-5,6,7,8-tetrahydro-pyrido[4′,3′:4,5]thieno[2,3-d]pyrimidine, and 4-(β-diethylaminoethylamino)-2-ethyl-6,8-bis-(3,4,5-trimethoxyphenyl)-7-pentyl-5,6,7,8-tetrahydro-pyrido[4′,3′:4 ,5]thieno[2,3-d]pyrimidine.

I claim:

1. A member selected from the group consisting of compounds of the formula

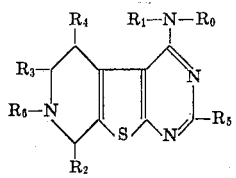

in which $R_o$ stands for a member selected from the group consisting of the groups of the formulas

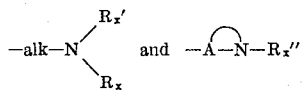

alk stands for lower alkylene having one to six carbon atoms, for a member selected from the group consisting of pyrrolidinyl-lower alkyl and piperidyl-lower alkyl, each of said lower alkyl portions having one to six carbon atoms, $R_x$, $R_x'$ and $R_x''$ each stands for a member selected from the group consisting of hydrogen and lower alkyl and when taken together with the nitrogen atom, $R_x$ and $R_x'$ stand for a member selected from the group consisting of pyrrolidino, piperidino, C-lower alkylated pyrrolidino, C-lower alkylated piperidino, N'-lower alkyl piperazino, N'-(hydroxy-lower alkyl)-piperazino, thiomorpholino, morpholino, C-lower alkylated N'-lower alkyl-piperazino, C-lower alkylated N'-(hydroxy-lower alkyl)-piperazino, C-lower alkylated thiomorpholino, C-lower alkylated morpholino, piperazino and C-lower alkylated piperazino, $R_1$ stands for a member selected from the group consisting of lower alkyl and hydrogen, $R_2$ and $R_3$ each stands for a member selected from the group consisting of hydrogen, lower alkyl and radicals of the formula

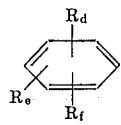

in which $R_d$, $R_e$, and $R_f$ each stands for a member selected from the group consisting of hydrogen, lower alkyl, lower alkoxy, halogen, trifluoromethyl, hydroxy, nitro, amino, mono-lower alkylamino, di-lower alkylamino, lower alkanoyloxy, benzoyloxy, phenyl-lower alkanoyloxy, lower alkanoylamino, benzoylamino, and phenyl-lower alkanoylamino and, when taken together, to of the said three symbols in adjacent positions for methylenedioxy, $R_4$ stands for a member selected from the group consisting of hydrogen, lower alkyl, phenyl, phenyl-lower alkyl, and phenyl and phenyl-lower alkyl substituted by a member selected from the group consisting of lower alkyl, lower alkoxy, methylenedioxy, halogen, trifluoromethyl, hydroxy, nitro, amino, mono-lower alkylamino, di-lower alkylamino, lower alkanoyloxy, benzoyloxy, phenyl-lower alkanoyloxy, lower alkanoylamino, benzoylamino and phenyl-lower alkanoylamino, $R_5$ stands for a member selected from the group consisting of hydrogen, lower alkyl, lower cycloalkyl, lower cycloalkyl-lower alkyl, phenyl-lower alkyl and phenyl-lower alkyl substituted by a member selected from the group consisting of lower alkoxy, methylenedioxy, halogeno, trifluoromethyl, hydroxy, nitro, amino, mono-lower alkylamino, di-lower alkylamino, lower alkanoyloxy, benzoyloxy, phenyl-lower alkanoyloxy, lower alkanoylamino, benzoylamino and phenyl-lower alkanoylamino, and $R_6$ for a member selected from the group consisting of hydrogen, lower alkyl, lower alkenyl, lower cycloalkyl, lower cyclo-alkyl-lower alkyl, phenyl, phenyl-lower alkyl, and phenyl and phenyl-lower alkyl substituted by a member selected from the group consisting of lower alkyl, lower alkoxy, methylenedioxy, halogen, trifluoromethyl, hydroxy, nitro, amino, mono-lower alkylamino, di-lower alkylamino, lower alkanoyloxy, benzoyloxy, phenyl-lower alkanoyloxy, lower alkanoylamino, benzoylamino and phenyl-lower alkanoylamino, and their therapeutically acceptable acid addition salts.

2. A product as claimed in claim 25, in which $R_o$ stands for the group of the formula

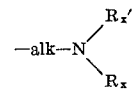

alk stands for lower alkylene, $R_x$ and $R_x'$ each for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, β-monounsaturated pyrrolidino, N'-lower alkyl piperazino, N'-(hydroxy-lower alkyl)-piperazino, thiomorpholino morpholino, C-lower alkylated N'-lower alkyl-piperazino, C-lower alkylated N'-(hydroxy-lower alkyl)-piperazino, C-lower alkylated thiomorpholino, C-lower alkylated morpholino, piperazino and C-lower alkylated piperazino, $R_1$, $R_4$, and $R_5$ each stands for a member selected from the group consisting of hydrogen and lower alkyl, $R_2$ and $R_3$ each stands for a group of the formula

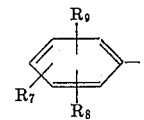

$R_7$, $R_8$ and $R_9$ each representing a member selected from the group consisting of hydrogen, lower alkyl, lower alkoxy, halogen and trifluoromethyl and $R_6$ is a member selected from the group consisting of lower alkyl, phenyl, phenyl-lower alkyl and phenyl and phenyl-lower alkyl substituted by a member selected from the group consisting of lower alkyl, lower alkoxy, halogen and trifluoromethyl.

3. A produce as claimed in claim 2, in which $R_1$ stands for hydrogen and $R_o$ for di-lower alkylamino-lower alkyl.

4. A product as claimed in claim 3 in which $R_4$ stands for hydrogen and $R_6$ for lower alkyl.

5. A product as claimed in claim 4, in which $R_5$ stands for hydrogen and $R_2$ and $R_3$ each stands for a member selected from the group consisting of parafluorophenyl, parachlorophenyl and parabromophenyl and $R_o$ for a member selected from the group consisting of di-lower alkylamino-ethyl and di-lower alkylamino-propyl.

6. A product as claimed in claim 5, in which $R_o$ stands for β-dimethylaminoethyl.

7. A product as claimed in claim 25, in which $R'_3$ and $R_4$ stand for hydrogen, each stands for phenyl, $R_5$ for a member selected from the group consisting of hydrogen and methyl, $R_6$ for methyl and $R_o$ for a member selected from the group consisting of β-diethylaminoethyl and β-dimethyl-aminoethyl.

8. A product as claimed in claim 1, in which $R_1$, $R'_2$, $R'_3$ and $R_4$ stand for hydrogen, $R_2$ and $R_3$ each stands for parachlorophenyl, $R_5$ for a member selected from the group consisting of hydrogen and methyl, $R_6$ for methyl and $R_o$ for a member selected from the group consisting of β-diethylaminoethyl, β-dimethylaminoethyl and β-morpholinoethyl.

9. A product as claimed in claim 25, in which $R_1$, $R_2$, $R'_3$, $R_4$ and $R_5$ stand for hydrogen atoms, $R_6$ for a member selected from the group consisting of lower alkyl and benzyl and $R_o$ for a member selected from the group consisting of piperidino-lower alkyl, pyrrolidino-lower alkyl, β-dimethylaminoethyl and γ-dimethylaminopropyl.

10. A product as claimed in claim 25, which is 4-(β-diethylamino-ethylamino)-6,8-bis-(parachlorophenyl)-7-methyl-5,6,7,8-tetrahydro-pyrido[4',3':4,5]thieno[2,3-d]pyrimidine or an acid addition salt thereof.

11. A product as claimed in claim 25, which is 4-(β-dimethylaminoethylamino)-6,8-bis-(para-chlorophenyl)-7-methyl-5,6,7,8-tetrahydropyrido[4',3':4,5]thieno[2,3-d]pyrimidine or an acid addition salt thereof.

12. A product as claimed in claim 11 in the cisform.

13. A product as claimed in claim 25, which is 2,7-dimethyl-4-(β-dimethylaminoethylamino)-6,8-bis-(parachlorophenyl)-5,6,7,8-tetrahydropyrido[4',3':4,5]thieno[2,3-d]pyrimidine or an acid addition salt thereof.

14. A product as claimed in claim 25, which is 4-[N-(β-diethylaminoethyl)-ethylamino]-6,8-bis-(parachlorophenyl)-7-methyl-5,6,7,8-tetrahydro-pyrido[4', 3':4,5]thieno[2,3-d]pyrimidine or an acid addition salt thereof.

CASE 6536/1+2

PO-1050
(5/69)

UNITED STATES PATENT OFFICE
CERTIFICATE OF CORRECTION

Patent No. 3,627,766      Dated December 14, 1971

Inventor(s) Kurt Eichenberger et al

It is certified that error appears in the above-identified patent and that said Letters Patent are hereby corrected as shown below:

Column 21, line 23, delete "$R_v^!$" and substitute -- $R_x^!$ --.

Column 22, lines 1, 49, 61, 67 and 72, in each delete "25" and substitute -- 1 --; line 14, delete "β-monounsaturated pyrrolidino,"; line 37, delete "produce" and substitute -- product --; line 49, delete "$R_3^!$" and substitute -- $R_1$ --; line 50, before "each" insert -- $R_2$ and $R_3$ --; line 54, delete "$R_2^!$, $R_3^!$"; line 61, delete "$R_3^!$" and substitute -- $R_3$ --; last line, delete "cisform" and substitute -- cis-form --.

Column 23, line 1, delete "25" and substitute -- 1 --; line 3, delete "tetrahydropyrido" and substitute -- tetrahydropyrido --.

Column 24, line 1, delete "25" and substitute --- 1 ---.

Signed and sealed this 11th day of July 1972.

(SEAL)
Attest:

EDWARD M. FLETCHER, JR.
Attesting Officer

ROBERT GOTTSCHALK
Commissioner of Patents